United States Patent
Guizilini

(10) Patent No.: US 12,299,914 B2
(45) Date of Patent: May 13, 2025

(54) SELF-SUPERVISED TRAINING FROM A TEACHER NETWORK FOR COST VOLUME BASED DEPTH ESTIMATES

(71) Applicant: TOYOTA RESEARCH INSTITUTE, INC., Los Altos, CA (US)

(72) Inventor: Vitor Guizilini, Santa Clara, CA (US)

(73) Assignees: TOYOTA RESEARCH INSTITUTE, INC., Los Altos, CA (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 420 days.

(21) Appl. No.: 17/903,712

(22) Filed: Sep. 6, 2022

(65) Prior Publication Data
US 2024/0087151 A1 Mar. 14, 2024

(51) Int. Cl.
*G06T 7/55* (2017.01)
*B60W 50/06* (2006.01)

(52) U.S. Cl.
CPC .............. *G06T 7/55* (2017.01); *B60W 50/06* (2013.01); *B60W 2420/403* (2013.01); *G06T 2207/10016* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2021/0278852 A1 | 9/2021 | Urtasun et al. | |
| 2023/0154038 A1* | 5/2023 | Guizilini | G06T 7/593 |
| | | | 382/106 |
| 2023/0281926 A1* | 9/2023 | Xu | G06T 7/73 |
| | | | 345/423 |
| 2023/0306600 A1* | 9/2023 | Zhang | G06N 3/063 |

(Continued)

FOREIGN PATENT DOCUMENTS

| | | |
|---|---|---|
| CN | 09564690 A | 4/2019 |
| CN | 110569709 A | 12/2019 |

(Continued)

OTHER PUBLICATIONS

Dosovitski et al. "An Image is Worth 16X16 Words: Transformers for Image Recognition at Scale", Published as a conference paper at ICLR 2021 (Year: 2021).*

(Continued)

*Primary Examiner* — Randolph I Chu
(74) *Attorney, Agent, or Firm* — Seyfarth Shaw LLP

(57) ABSTRACT

A method for controlling a vehicle in an environment includes generating, via a cross-attention model, a cross-attention cost volume based on a current image of the environment and a previous image of the environment in a sequence of images. The method also includes generating combined features by combining cost volume features of the cross-attention cost volume with single-frame features associated with the current image. The single-frame features may be generated via a single-frame encoding model. The method further includes generating a depth estimate of the (Continued)

current image based on the combined features. The method still further includes controlling an action of the vehicle based on the depth estimate.

20 Claims, 10 Drawing Sheets

(56) References Cited

U.S. PATENT DOCUMENTS

| | | | | |
|---|---|---|---|---|
| 2023/0326215 A1* | 10/2023 | Yu | ............... | G06V 20/58 |
| | | | | 701/28 |
| 2023/0343414 A1* | 10/2023 | Vessere | ............... | G16B 30/00 |
| 2023/0386052 A1* | 11/2023 | Lyu | ............... | G06V 10/255 |
| 2023/0396817 A1* | 12/2023 | Mittal | ............... | G06V 10/82 |
| 2024/0029286 A1* | 1/2024 | Guizilini | ............... | G06T 7/596 |
| 2024/0303841 A1* | 9/2024 | Yasarla | ............... | G06V 10/44 |

FOREIGN PATENT DOCUMENTS

| | | | | |
|---|---|---|---|---|
| CN | 113435573 A | | 9/2021 | |
| CN | 115035171 A | * | 9/2022 | ............... G06T 7/50 |
| JP | 2021522603 A | | 8/2021 | |
| KR | 101905142 B1 | | 10/2018 | |
| WO | 2019038193 A1 | | 2/2019 | |

OTHER PUBLICATIONS

Chen et al. "CrossViT: Cross-Attention Multi-Scale Vision Transformer for Image Classification", ICCV 2021 (Year: 2021).*

Wang et al. "Learning Depth from Monocular Videos using Direct Methods", arXiv:1712.00175v1 [cs.CV] Dec. 1, 2017 (Year: 2017).*

Zhao et al. "Monocular Depth Estimation Based on Deep Learning: An Overview", arXiv:2003.06620v2 [cs.CV] Jul. 3, 2020 (Year: 2020).*

* cited by examiner

SELF-SUPERVISED TRAINING FROM A TEACHER NETWORK FOR COST VOLUME BASED DEPTH ESTIMATES

BACKGROUND

Field

Certain aspects of the present disclosure generally relate to depth estimates, and more specifically to systems and methods for self-supervised depth estimation.

Background

Autonomous agents (e.g., vehicles, robots, etc.) rely on machine vision for constructing a three-dimensional (3D) representation of a surrounding environment. The 3D representation may be used for various tasks, such as localization and/or autonomous navigation. In some examples, the 3D representation may be generated from a depth estimate of an environment. Therefore, an accuracy of the 3D representation may be based on an accuracy of the depth estimate. Thus, improving an accuracy of the depth estimate may improve the accuracy of the 3D representation, which in turn, improves an ability of the autonomous agent to perform various tasks.

In some cases, a single frame may be used to estimate a depth of an environment. In other cases, multiple frames (multi-frame) may be used to estimate the depth. Multi-frame depth estimation may be considered an improvement of over single frame depth estimation because multi-frame depth estimation may leverage geometric relationships between images via feature matching, in addition to learning appearance-based features. If depth information is available at training time, the depth information may be used to supervise a multi-frame depth estimation network with ground-truth information, thereby improving depth estimation results.

In some examples, cost volumes may be used to estimate depth for a 3D image of a scene. In some examples, the cost volume is generated by combining information from multiple images onto a single 3D structure and evaluating a similarity metric between all pixel pairs given a series of possible depth ranges. Pixel pairs with a highest similarity may be referred to as correct pixel pairs. A depth estimation network (e.g., artificial neural network) may leverage activations associated with the correct pixel pairs to generate depth estimates.

SUMMARY

In one aspect of the present disclosure, a method for controlling a vehicle in an environment includes generating, via a cross-attention model, a cross-attention cost volume based on a current image of the environment and a previous image of the environment in a sequence of images. The method further includes generating combined features by combining cost volume features of the cross-attention cost volume with single-frame features associated with the current image. The single-frame features may be generated via a single-frame encoding model. The method still further includes generating a depth estimate of the current image based on the combined features. The method also includes controlling an action of the vehicle based on the depth estimate.

Another aspect of the present disclosure is directed to an apparatus including means for generating, via a cross-attention model, a cross-attention cost volume based on a current image of the environment and a previous image of the environment in a sequence of images. The apparatus further includes means for generating combined features by combining cost volume features of the cross-attention cost volume with single-frame features associated with the current image. The single-frame features may be generated via a single-frame encoding model. The apparatus still further includes means for generating a depth estimate of the current image based on the combined features. The apparatus also includes means for controlling an action of the vehicle based on the depth estimate.

In another aspect of the present disclosure, a non-transitory computer-readable medium with non-transitory program code recorded thereon is disclosed. The program code is executed by a processor and includes program code to generate, via a cross-attention model, a cross-attention cost volume based on a current image of the environment and a previous image of the environment in a sequence of images. The program code further includes program code to generate combined features by combining cost volume features of the cross-attention cost volume with single-frame features associated with the current image. The single-frame features may be generated via a single-frame encoding model. The program code still further includes program code to generate a depth estimate of the current image based on the combined features. The program code also includes program code to control an action of the vehicle based on the depth estimate.

Another aspect of the present disclosure is directed to an apparatus including a processor, and a memory coupled with the processor and storing instructions operable, when executed by the processor, to cause the apparatus to generate, via a cross-attention model, a cross-attention cost volume based on a current image of the environment and a previous image of the environment in a sequence of images. Execution of the instructions also cause the apparatus to generate combined features by combining cost volume features of the cross-attention cost volume with single-frame features associated with the current image. The single-frame features may be generated via a single-frame encoding model. Execution of the instructions further cause the apparatus to generate a depth estimate of the current image based on the combined features. Execution of the instructions still further cause the apparatus to control an action of the vehicle based on the depth estimate.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
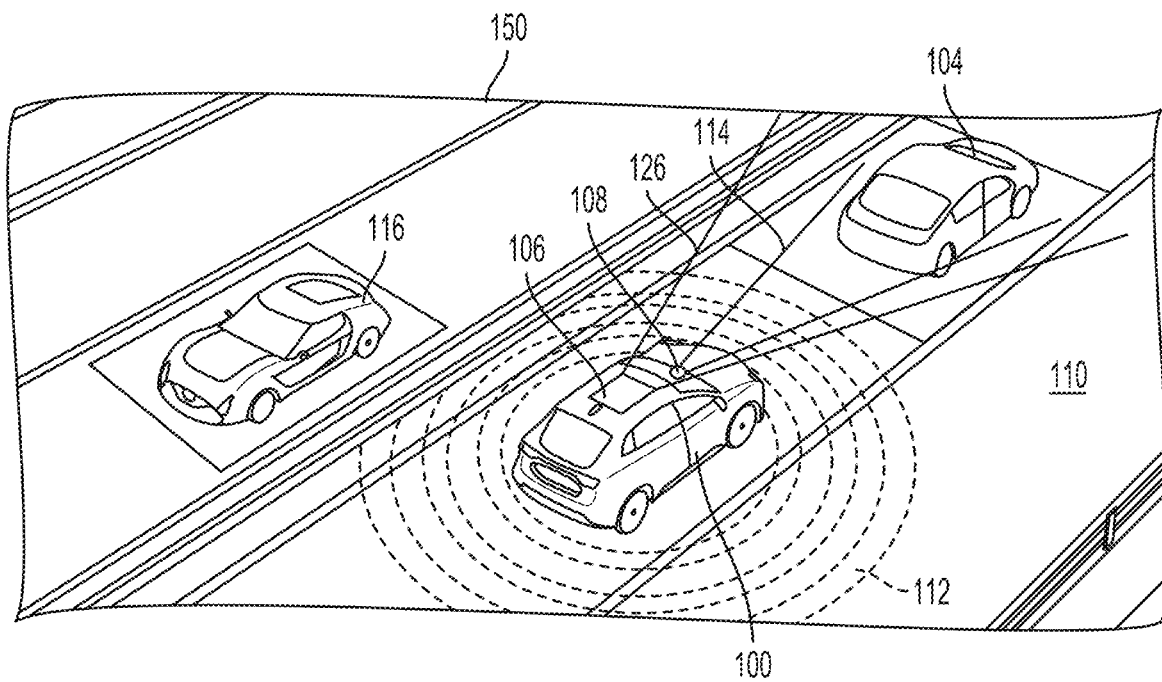
FIG. 1A is a diagram illustrating an example of a vehicle in an environment, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

The ability to perceive distances through depth estimation based on sensor data provides an ability to plan/estimate ego-motion through the environment. Therefore, an agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

In some cases, a single frame may be used to estimate a depth of an environment. In other cases, multiple frames (multi-frame) may be used to estimate the depth. Multi-frame depth estimation may be considered an improvement of over single frame depth estimation because multi-frame depth estimation may leverage geometric relationships between images via feature matching, in addition to learning appearance-based features. In some examples, cost volumes may be used by a multi-frame depth estimation network (e.g., a multi-frame monocular depth estimation network) to estimate a depth of an environment. In some examples, the cost volume is generated by combining information from multiple images onto a single 3D structure and evaluating a similarity metric between all pixel pairs given a series of possible depth ranges. Pixel pairs with a highest similarity may be referred to as correct pixel pairs. A depth estimation network (e.g., artificial neural network) may leverage activations associated with the correct pixel pairs to generate depth estimates.

Cost volumes may increase an accuracy of depth estimates for static objects. However, the use of cost volumes in a multi-frame depth estimation network may reduce an accuracy of the depth estimates associated with dynamic objects, low texture areas, and/or occluded objects. Therefore, it may be desirable to use self-supervised learning to improve the accuracy of the depth estimates generated based on cost volumes.

Deep learning approaches, such as self-supervised learning, may eliminate hand-engineered features (e.g., labeled data) and improve depth estimates as well as 3D model reconstruction. For example, self-supervised learning improves the reconstruction of textureless regions and/or geometrically under-determined regions. Aspects of the present disclosure are directed to self-supervised depth estimates based on cost volumes.

Particular aspects of the subject matter described in this disclosure may be implemented to realize one or more of the following potential advantages. In some examples, the described techniques may provide ground-truth data for training a cost volume-based depth estimation network in a self-supervised manner. In such examples, the overall accuracy of the depth estimates generated based on the cost volumes may improve. Specifically, the accuracy of the depth estimates for dynamic objects, textureless objects, and/or occluded objects may improve.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
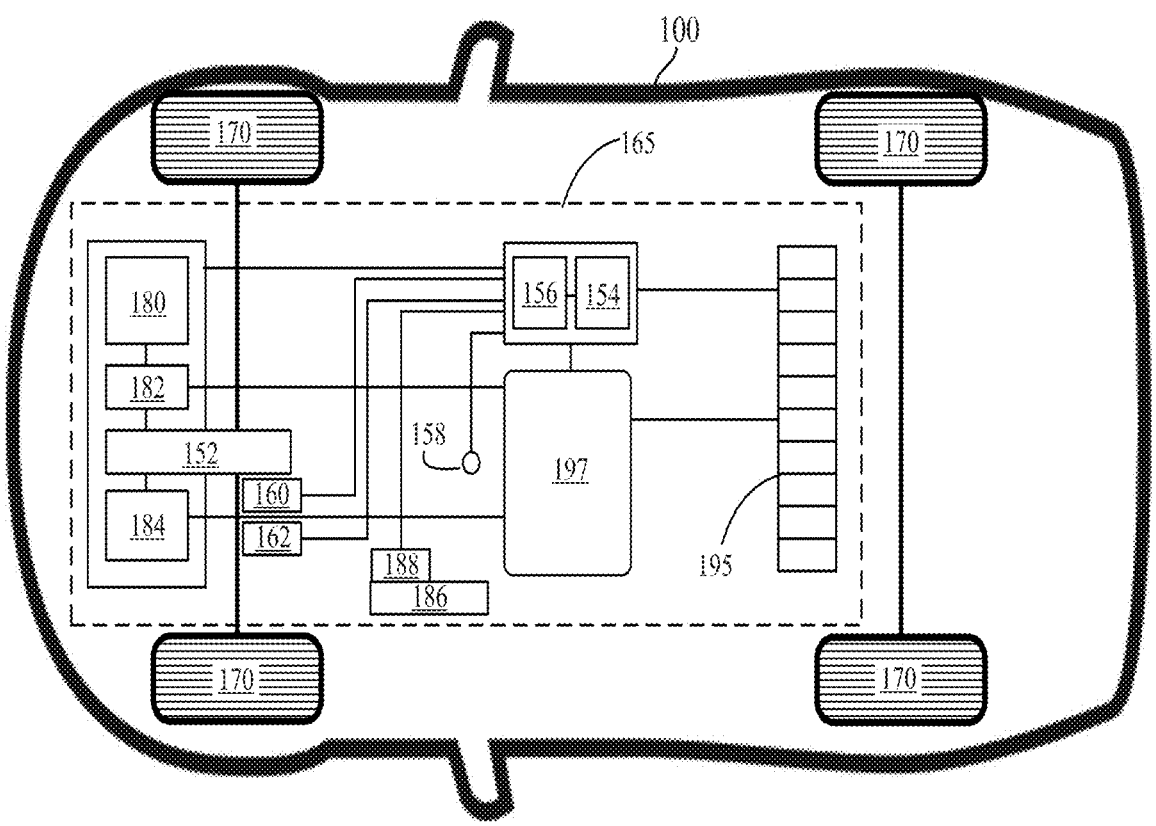
FIG. 1B is a diagram illustrating an example the vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
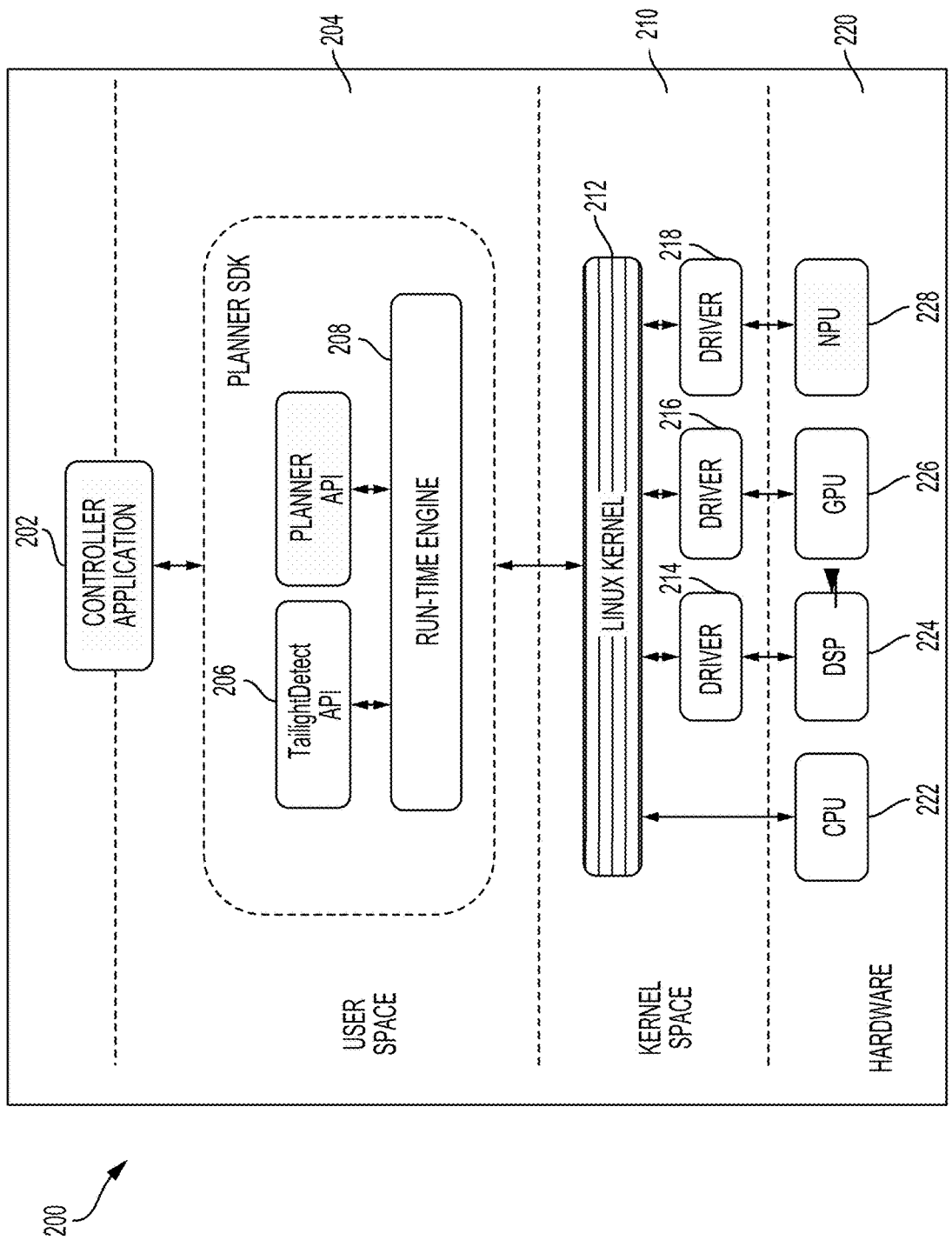
FIG. 2 is a block diagram illustrating a software architecture that may modularize artificial intelligence (AI) functions for planning and control of an autonomous agent, in accordance with various aspects of the present disclosure.

FIG. 2 is a block diagram illustrating a software architecture 200 that may modularize artificial intelligence (AI) functions for planning and control of an autonomous agent, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
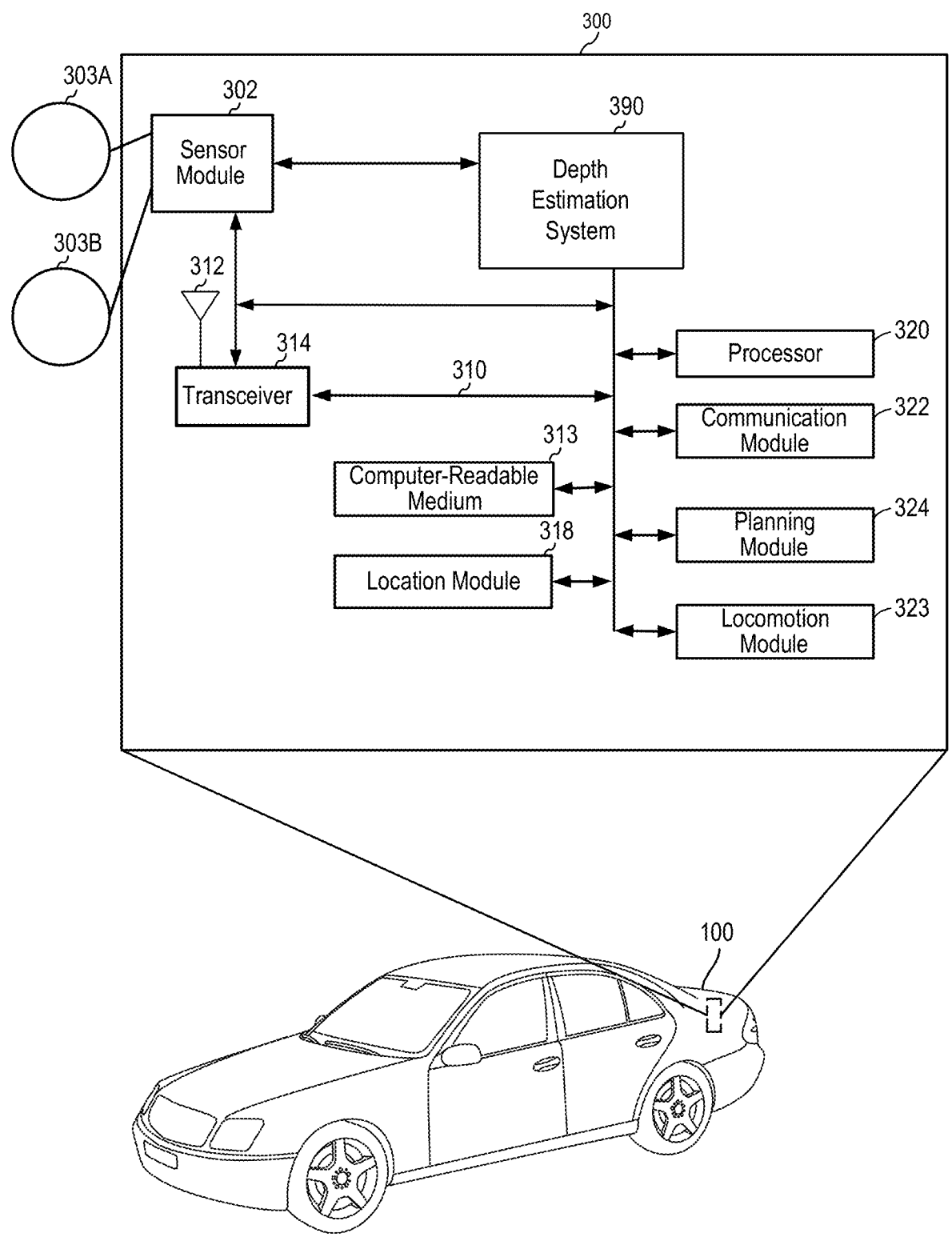
FIG. 3 is a diagram illustrating an example of a hardware implementation for a vehicle control system, in accordance with various aspects of the present disclosure.

FIG. 3 is a diagram illustrating an example of a hardware implementation for a vehicle control system 300, according to aspects of the present disclosure. The vehicle control system 300 may be a component of a vehicle, a robotic device, or other device. For example, as shown in FIG. 3, the vehicle control system 300 is a component of a vehicle 100. Aspects of the present disclosure are not limited to the vehicle control system 300 being a component of the vehicle 100, as other devices, such as a bus, boat, drone, or robot, are also contemplated for using the vehicle control system 300. In the example of FIG. 3, the vehicle system may include a depth estimation system 390. In some examples, depth estimation system 390 is configured to perform operations, including operations of the process 800 described with reference to FIG. 8.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The vehicle control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the vehicle control system 300 can be combined into a single module.

The vehicle control system 300 includes the processor 320 coupled to the computer-readable medium 313. The processor 320 performs processing, including the execution of software stored on the computer-readable medium 313 providing functionality according to the disclosure. The software, when executed by the processor 320, causes the vehicle control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the vehicle control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The vehicle control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof.

The depth estimation system 390 may be in communication with the sensor module 302, the transceiver 314, the processor 320, the communication module 322, the location module 318, the locomotion module 323, the planning module 324, and the computer-readable medium 313. In some examples, the behavior planning system may be implemented as a machine learning model, such as a vehicle control system 300 as described with reference to FIG. 3. Working in conjunction with one or more of the sensors 303A, 303B, the sensor module 302, and/or one or more other modules 313, 314, 318, 320, 322, 323, 324, the depth estimation system 390 may generate, via a cross-attention model, a cross-attention cost volume based on a current image of the environment and a previous image of the environment in a sequence of images. Furthermore, the depth estimation system 390 may generate combined features by combining cost volume features of the cross-attention cost volume with single-frame features associated with the current image. The single-frame features may be generated via a single-frame encoding model. Additionally, the depth estimation system 390 may generate a depth estimate of the current image based on the combined features. Also, the depth estimation system 390 may control an action of the vehicle 328 based on the depth estimate.

Figure 4A:
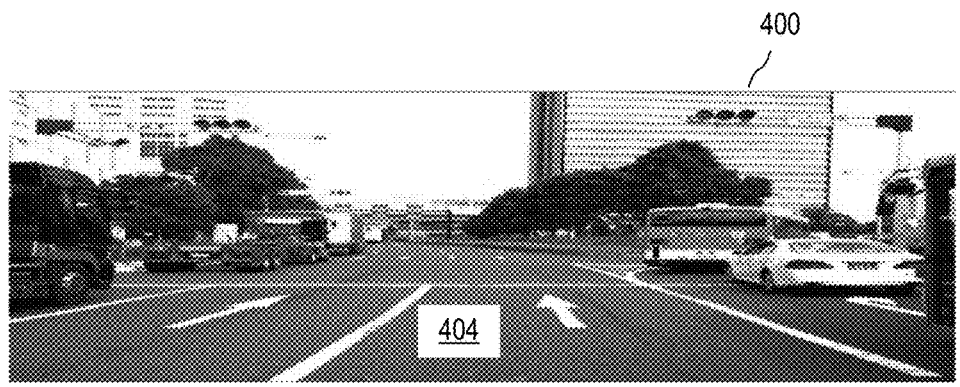
FIG. 4A illustrates an example of a target image of a scene, in accordance with various aspects of the present disclosure.

FIG. 4A illustrates an example of a target image 400 of a scene 404 according to aspects of the present disclosure. The target image 400 may be captured by a monocular camera or may be one image of a multi-frame image captured by one or more cameras. The one or more cameras may capture a forward-facing view of an agent (e.g., a vehicle). In one configuration, the one or more cameras are integrated with the vehicle, such as the vehicle 100 described with reference to FIGS. 1A and 1B. For example, the one or more cameras may be defined in a roof structure, windshield, grill, or other portion of the vehicle. The target image 400 may also be referred to as a current image. The target image 400 captures a 2D representation of a scene.

Figure 4B:
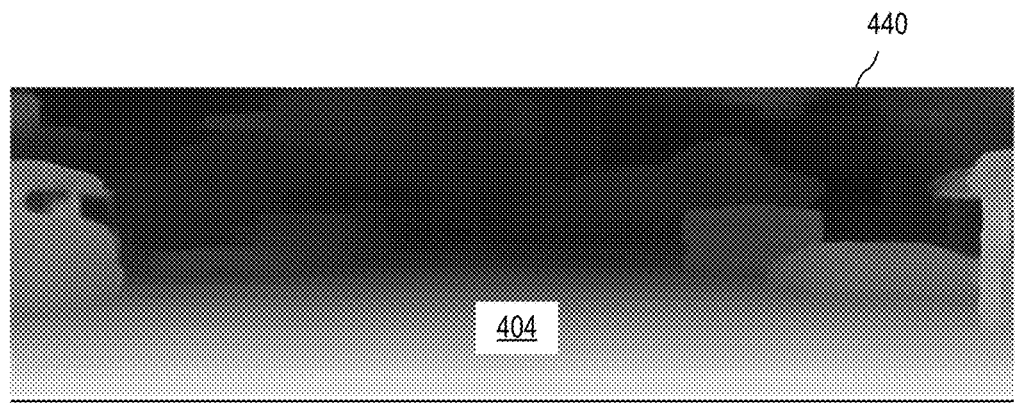
FIG. 4B illustrates an example of a depth map of the scene, in accordance with various aspects of the present disclosure.

FIG. 4B illustrates an example of a depth map 440 of the scene 404 according to aspects of the present disclosure. The depth map 440 may be estimated from the target image 400 and one or more source images. The source images may be images captured at a previous time step in relation to the target image 400. The depth map 440 provides a depth of a scene. The depth may be represented as a color or other feature.

Figure 4C:
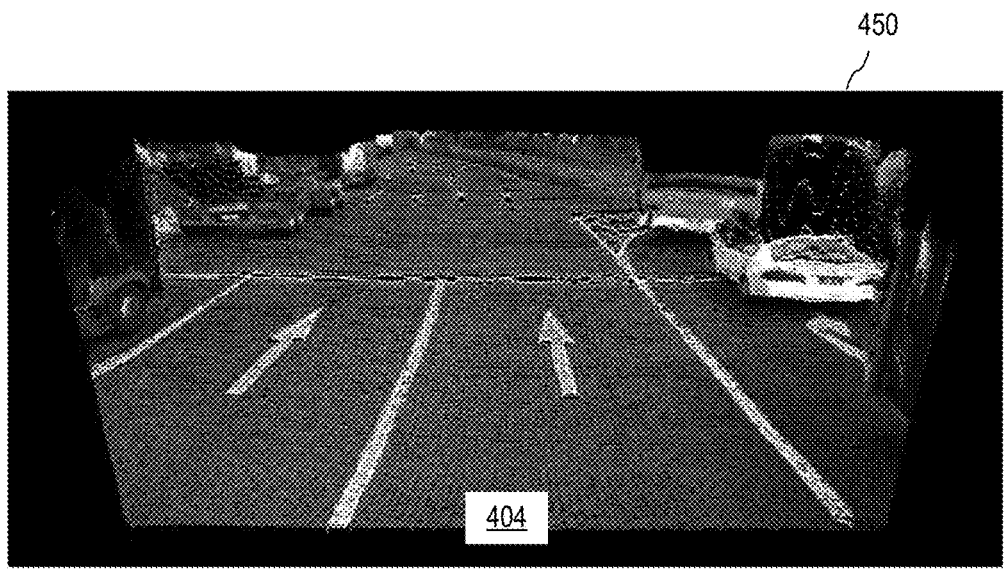
FIG. 4C illustrates an example of a 3D reconstruction of the scene, in accordance with various aspects of the present disclosure.

FIG. 4C illustrates an example of a 3D reconstruction 450 of the scene 404 according to aspects of the present disclosure. The 3D reconstruction may be generated from the depth map 440 as well as a pose of the target image 400 and a source image. As shown in FIGS. 4A and 4C, the viewing angle of the scene 404 in the 3D reconstruction 450, is different from the viewing angle of the scene 404 in the target image 400. Because the 3D reconstruction 450 is a 3D view of the scene 404, the viewing angle may be changed as desired. The 3D reconstruction 450 may be used to control one or more actions of the agent.

Depth estimation systems use one or more sensors to build three-dimensional (3D) representations of a local environment. In some cases, a depth estimation sensor may use a LIDAR sensor. Additionally, or alternatively, depth estimation systems may use cameras, such as a red-green-blue (RGB) camera. Aspects of the present disclosure are directed to a system for training and using a depth network to build 3D representation from two or more images captured by one or more sensors associated (e.g., integrated) with an agent. In some examples, each image captured by the one or more sensors may include different objects, such as dynamic and/or static objects, at different depths with respect to a reference location. In the present disclosure, a depth of an object in an image may refer to a distance of the object points (for example, pixels) from a reference location, such as a camera location.

Feature matching is a fundamental component of Structure-from-Motion (SfM). By establishing correspondences between points across frames, a wide range of tasks can be performed, including depth estimation ego-motion estimation, keypoint extraction, calibration, optical flow, and scene flow. Within these tasks, self-supervision enables learning without explicit ground-truth, by using view synthesis losses obtained via the warping of information from one image onto another, obtained from multiple cameras or a single moving camera. While more challenging from a training perspective, self-supervised methods can leverage arbitrarily large amounts of unlabeled data, which has been shown to achieve performance comparable to supervised methods, while enabling new applications such as test-time refinement and unsupervised domain adaptation.

In some conventional systems, single-frame self-supervised methods use multi-view information at training time, as part of the loss calculation. In contrast, multi-frame systems use multi-view information at inference time. For example, conventional systems may build cost volumes or correlation layers. These multi-frame systems learn geometric features in addition to appearance-based ones, which leads to better performance relative to single-frame methods.

However, multi-frame calculation relies heavily on feature matching to establish correspondences between frames, using only image information. Because of that, correspondences will be noisy and often inaccurate due to ambiguities and local minima caused by lack of texture, repetitions, luminosity changes, dynamic objects, and so forth.

Various aspects of the present disclosure improve self-supervised feature matching, focusing on the depth estimation, such as monocular depth estimation or multi-frame monocular depth estimation. In some implementations, a cost volume between target image features and context image features may be used to estimate a depth of an environment. Such depth estimates may be used for 3D reconstruction. In some examples, a 3D model of a scene may be estimated by determining a stereo correspondence between a first image and a second image of the scene. The stereo correspondence may be based on a cross-attention cost volume generated at a cross-attention cost volume generation model (e.g., cost volume model). Each image may be captured by a sensor associated with an agent, such as the vehicle 100 described with reference to FIGS. 1A and 1B. The stereo correspondence may be determined by matching pixels between the first image and the second image. The pixels may be matched based on a similarity metric for all pixel pairs given a series of possible depth ranges. The similarity metric of matching pixel pairs may satisfy a matching condition, such as a value of the similarity metric being less than a threshold. A low similarity metric value associated with two pixels may correspond to a high similarity between the two pixels.

Figure 5A:
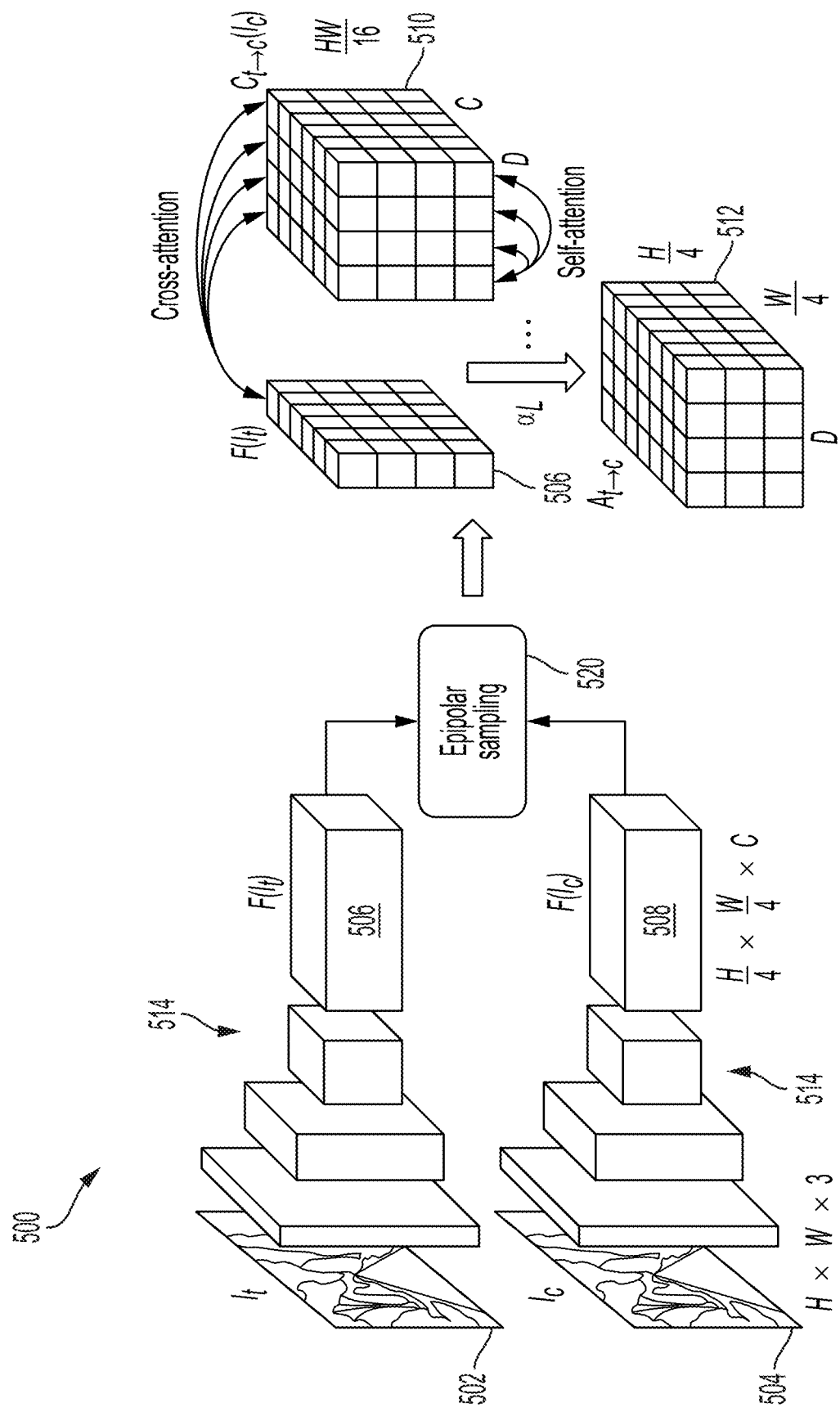
FIG. 5A is a block diagram illustrating an example of a cross-attention cost volume generation model, in accordance with various aspects of the present disclosure.

FIG. 5A is a block diagram illustrating an example of a cross-attention cost volume generation model 500, in accordance with various aspects of the present disclosure. For ease of explanation, the cross-attention cost volume generation model 500 may be referred to as the cost volume model 500. As shown in the example of FIG. 5A, the cost volume model 500 may receive two input images 502 and 504, having dimensions H×W—3, where H represents a height, W represents a width, and 3 represents a number of channels, such as red, green, and blue. A first image 502 may be a target image $I_t$ and a second image 504 may be a context image $I_c$. Each image 502 and 504 may be encoded by an encoder network 514 to produce C-dimensional target features 506) and context features 508 ($F_c$) at a fraction of an original resolution, such as ¼ the original resolution. For each target feature $f_t^{uv} \in F_t$, corresponding to pixel $F_t=\{u, v\}$, matching candidates may be sampled from context features 508 $F_c$ along an epipolar line $\varepsilon_{t \to c}^{uv}$ by an epipolar sampler 520 (see FIG. 5B). In the present application, context features $F_c$ may also be represented as $F(I_c)$. Additionally, target features $F_t$ may also be represented as $F(I_t)$. In some examples, spatial-increasing discretization (SID) may be used to uniformly sample depth value in log space. Assuming D bins ranging from $d_{min}$ to $d_{max}$, each depth value $d_i$ is given by:

$$\log(d_i) = \log(d_{min}) + \frac{\log\left(\frac{d_{max}}{d_{min}}\right) * i}{D} \quad (1)$$

In the example of FIG. 5A, a feature volume 510 ($C_{t \to c}$) may be generated from the matching candidates. Dimensions of the feature volume 510 ($C_{t \to c}$) may be H/4×W/4×D×C. Each cell (u, v, i) receives sampled features $F_{t \to c}^{uv}=F_c \langle u'_i, v'_i \rangle$, for $i \in [0, \ldots, D]$ where $\langle \ \rangle$ is a bilinear sampling operator and $(u'_i, v'_i)$ represent projected pixel coordinates, such that:

$$z'_i \begin{bmatrix} u'_i \\ v'_i \\ 1 \end{bmatrix} = KR_{t \to c}\left(K^{-1} \begin{bmatrix} u \\ v \\ 1 \end{bmatrix} d_i + t_{t \to c}\right) \quad (2)$$

In Equation 2, $R_{t \to c}$ and $t_{t \to c}$ represent relative rotation ($R_{t \to c}$ and translation ($t_{t \to c}$) between frames, and $K \in \mathbb{R}^{3 \times 3}$ represent pinhole camera intrinsics. In practice, the relative rotation and translation may be predicted by a pose network, and pinhole camera intrinsics (K) may be a known constant.

In some examples, an attention model (not shown in FIG. 5A) may compute a similarity between the target features 506 ($F_t$) and the feature volume 510 ($C_{t \to c}$). In some such examples, L multi-head attention layers may be used to split the C feature channel dimensions into $N_h$ groups, such that $C_h = C/N_h$. Feature updates may be computed per head h of the L multi-head attention layers, each update may have different representations. For each attention head h, a set of linear projections are used to compute queries $Q_h$ from the target features $F_t$, and keys $K_h$ and values $V_h$ from the feature volume $C_{t \to c}$:

$$Q_h = F_t W_{Q_h} + b_{Q_h} \quad (3)$$

$$K_h = C_{t \to c} W_{K_h} + b_{K_h} \quad (4)$$

$$V_h = C_{t \to c} W_{V_h} + b_{V_h} \quad (5)$$

In Equations 3, 4, and 5, $W_{Q_h}, W_{H_h}, W_{V_h} \in R^{C_h \times C_h}$, and $b_{Q_h}, b_{K_h}, b_{V_h} \in R^{C_h}$. Similarities may be normalized per-bin using softmax to obtain attention values $\alpha_h = \in R^{N_h \times D}$:

$$\alpha_h = softmax\left(\frac{Q_h^T K_h}{\sqrt{C_h}}\right) v_D \quad (6)$$

The output values $V \in R^C$ may be obtained as a weighted concatenation of per-head output values:

$$V = (\alpha_1 V_1 \oplus \ldots \oplus \alpha_{N_h} V_{N_h}) W_O + b_O \quad (7)$$

In Equation 7, $W_O \in R^{C \times C}$, $b_O \in R^C$, and $\oplus$ is a concatenation operation. Per-bin attention values $$\alpha = \frac{1}{N_h} \sum_h \alpha_h$$

may be obtained by averaging over the number of heads. The process of obtaining per-bin attention values may be repeated L times, each using the output values V to update the feature volume for key and value calculation, such that $C_{t \to c}^{l+1} = V^l$. Final attention values may be used to populate a cross-attention cost volume 512 ($A_{t \to c}$. The cross-attention cost volume 512 may be a H/4×W/4×D structure that encodes a similarity between each feature from the target features 506) and candidates from the feature volume 510 ($C_{t \to c}$). The feature volume 510 may also be referred to as sampled context features ($C_{t \to c}$). Each cell (u, v, i) in the cross-attention cost volume 512 receives a corresponding attention value $\alpha(u'_i, v'_i)$ from a last cross-attention layer as the similarity metric for feature matching.

In some examples, the cross-attention may be alternated between the target features 506) and candidates from the feature volume 510 ($C_{t \to c}$) with self-attention among epipolar-sampled context features. In this setting, queries $Q'_h$ may be calculated from the feature volume 510 ($C_{t \to c}$), such that, $Q'_h = C_{t \to c} W'_{Q_h} + b'_{Q_h}$. The self-attention refinement step may take place after each cross-attention layer, and may be repeated L-1 times. It may be omitted from a last iteration because cross-attention weights $\alpha$ from the last layer L may be used to populate $A_{t \to c}$, as opposed to output values V. Therefore, self-attention updates are not used for the last layer L.

Figure 5B:
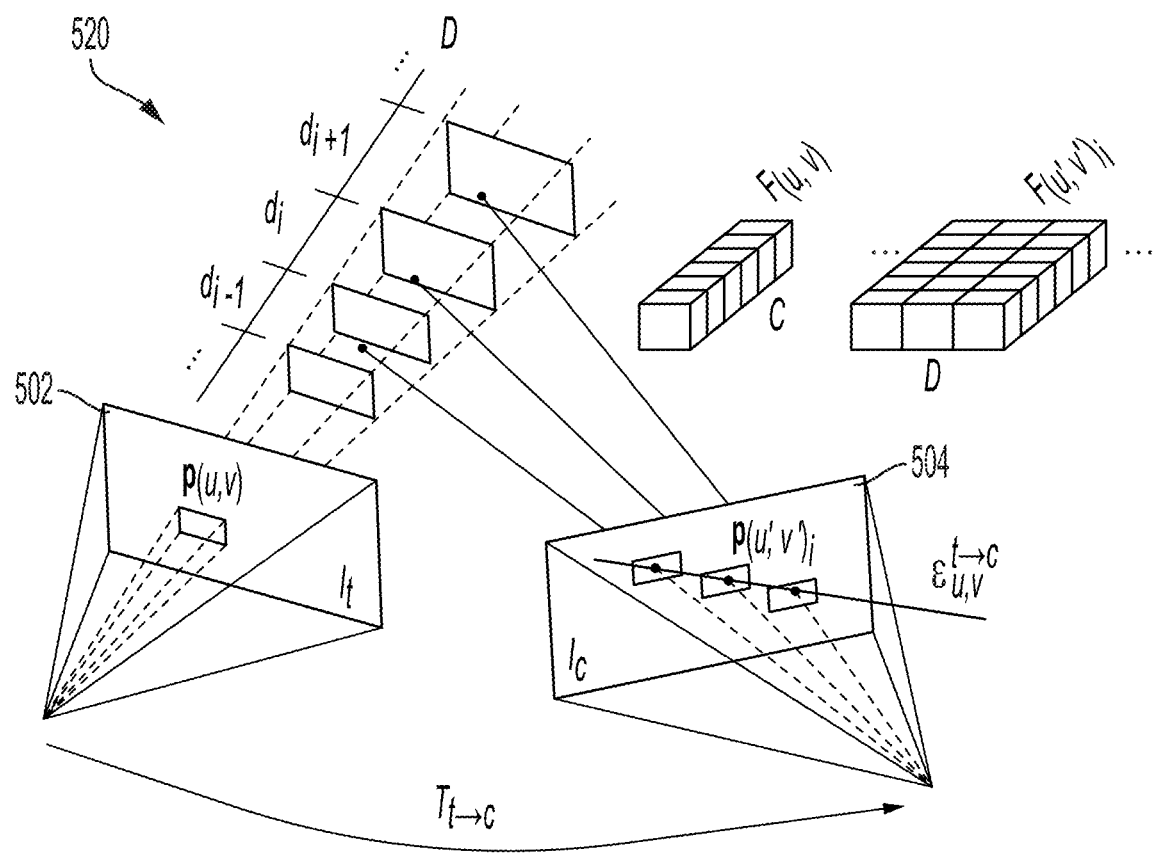
FIG. 5B is a block diagram illustrating an example of an epipolar sampler, in accordance with various aspects of the present disclosure.

FIG. 5B is a block diagram illustrating an example of an epipolar sampler 520, in accordance with various aspects of the present disclosure. The example of FIG. 5B may be an example of depth-discretized epipolar sampling. In the example of FIG. 5B, for each target feature F(u, v), D matching candidates $F(u'_i, v'_i)$ are sampled from a depth-discretized epipolar line $\varepsilon_{t \to c}^{uv}$. That is, for each target feature $f_t^{uv} \in F_t$, corresponding to pixel $F_t = \{u, v\}$ in a target image 502, matching candidates may be sampled from context features 508 ($F_c$) along an epipolar line $\varepsilon_{t \to c}^{uv}$ in a context image 504.

The process for generating cost volumes from monocular information as described with reference to FIGS. 5A and 5B may fail if a camera associated with an ego vehicle is static between frames. Additionally, or alternatively, the process for generating the cost volumes may assume a static world, and may fail in the presence of dynamic objects. To circumvent these limitations, various aspects are directed to combining multi-frame cost volumes with features from a single-frame depth network. These features are then decoded jointly, which makes predicted depth maps robust to multi-frame failure cases.

Figure 6:
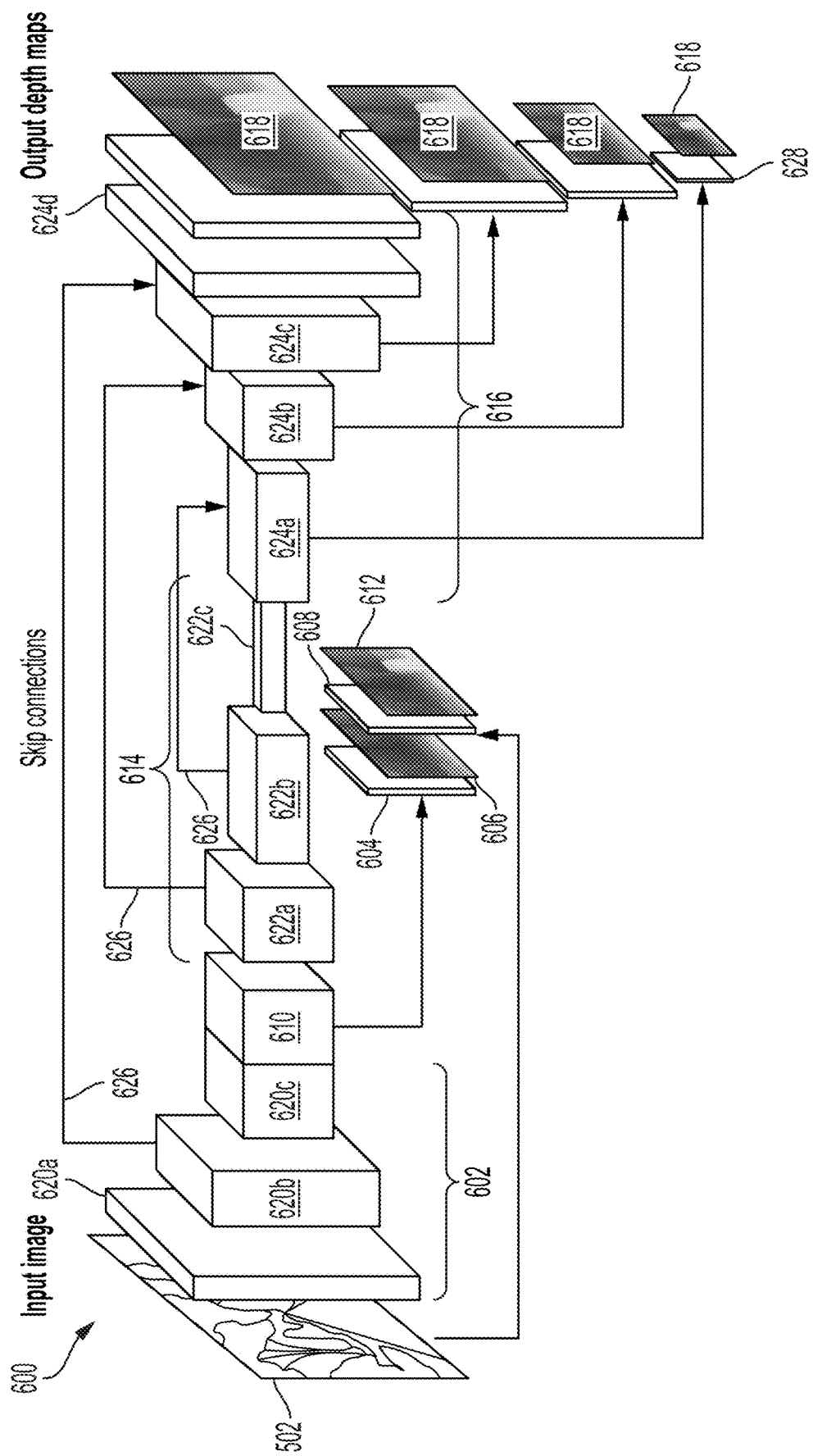
FIG. 6 is a block diagram illustrating an example of a decoding architecture that augments a single-frame encoder with multi-frame cross-attention features, in accordance with various aspects of the present disclosure.

FIG. 6 is a block diagram illustrating an example of a decoding architecture 600 that augments a single-frame encoder 602 with multi-frame cross-attention features, in accordance with various aspects of the present disclosure. As shown in the example of FIG. 6, the single-frame encoder 602 may receive a first image 502 (e.g., target image $I_t$) and encode single-frame features associated with the first image 502. The single-frame encoder 602 may include multiple encoder layer 620*a*, 620*b*, 620*c*.

Additionally, the cost volume features 610 of the cross-attention cost volume 512 (shown in FIG. 5A) may be masked. As shown in FIG. 6, the cost volume features 610 may be received at a high response layer 604. The high response layer 604 may be used to remove pixels from a cost-volume depth map (not shown in FIG. 6) with a confidence that is less than a confidence threshold, thereby generating a masked cost-volume depth map 606.

In some examples, a localized high-response window may be used to estimate continuous depth values from discretized bins, thereby increasing robustness to multi-modal distributions. In such examples, for each pixel $p_{uv}$, the argmax operation may be used to find an index $h_{uv}$ of a most probable cross-attention weight $\alpha$ alongside its same epipolar line $\varepsilon_{t \to c}^{uv}$. A one-dimensional 2s+1 window may be placed around the index $h_{uv}$ and a renormalization step may be applied:

$$\tilde{\alpha}_i = \frac{\alpha_i}{\sum_i \alpha_i}, \text{ for } i \in [h-s, h+s], \quad (8)$$

such that its sum is one. The depth value for the pixel $p_{uv}$ may be calculated by multiplying the renormalized distribution with corresponding depth bins:

$$\hat{d}_H = \Sigma_{i \in [h-s, h+s]} d_i \tilde{\alpha}_i \quad (9)$$

The normalized attention values may be used as a measure of matching confidence. In some examples, maximum attention values may decrease at longer depth ranges. In some such examples, the maximum attention values may decrease to a vanishing point. This may be expected due to resolution degradation and motion between frames. The matching confidence metric may be leveraged by masking out pixels with a maximum attention value that is less than a threshold $\lambda_{min}$. The pixels may be masked for the high response loss calculation and the pixels may be kept for during the decoding process.

As discussed, the cross-attention cost volume may be regressed over epipolar lines. Therefore, the cross-attention cost volume may lack surrounding context information. To address the lack of context information, a context adjustment layer 608 may be used to adjust depth values of the masked cost-volume depth map 606 via condition input images. This adjustment may be residual, with the output being added to the normalized high-response depth map (e.g., masked cost-volume depth map 606), before it is restored using the same statistics. A context adjusted depth map 612 may be generated based on the context adjustment layer 608.

The single-frame features from the single-frame depth encoder 602 and the cost volume features 610 may be augmented via a cross-attention matching network 614. The cross-attention matching network 614 may be an example of a bottleneck convolution network. The cross-attention matching network 614 may include multiple layers 622a, 622b, 622c. Multi-frame cross-attention features may be generated as a result of augmenting the single-frame features with the cost volume features 610. The multi-frame cross-attention features may be decoded by a decoding network 616 to generate depth maps 618 at multiple scales. The decoding network 616 may include multiple layers 624a, 624b, 624c, 624d. An inverse depth layer 628 may be associated with each depth map 618. In the example of FIG. 6, each depth map 618 may be associated with a different scale. Skip connections 626 transmit activations and gradients between encoder layers and decoder layers, such as between layers 620b, 622a, 622b and layers 624a, 624b, 624c. The skip connections 626 facilitate resolving higher resolution details. For example, a gradient may be directly back-propagated to layers via the skip connections 626, thereby improving training. Additionally, the skip connections 626 directly transmit image details (e.g., features) from convolutional layers to deconvolutional layers, thereby improving image recovery at higher resolutions.

As discussed, a teacher-student training procedure may be used to improve the performance of multi-frame predictions via the supervision of the single-frame encoder 602 in areas where cost volume generation fails. This single-frame encoder 602 is trained jointly, sharing the same pose predictions, and discarded during evaluation.

Figure 7:
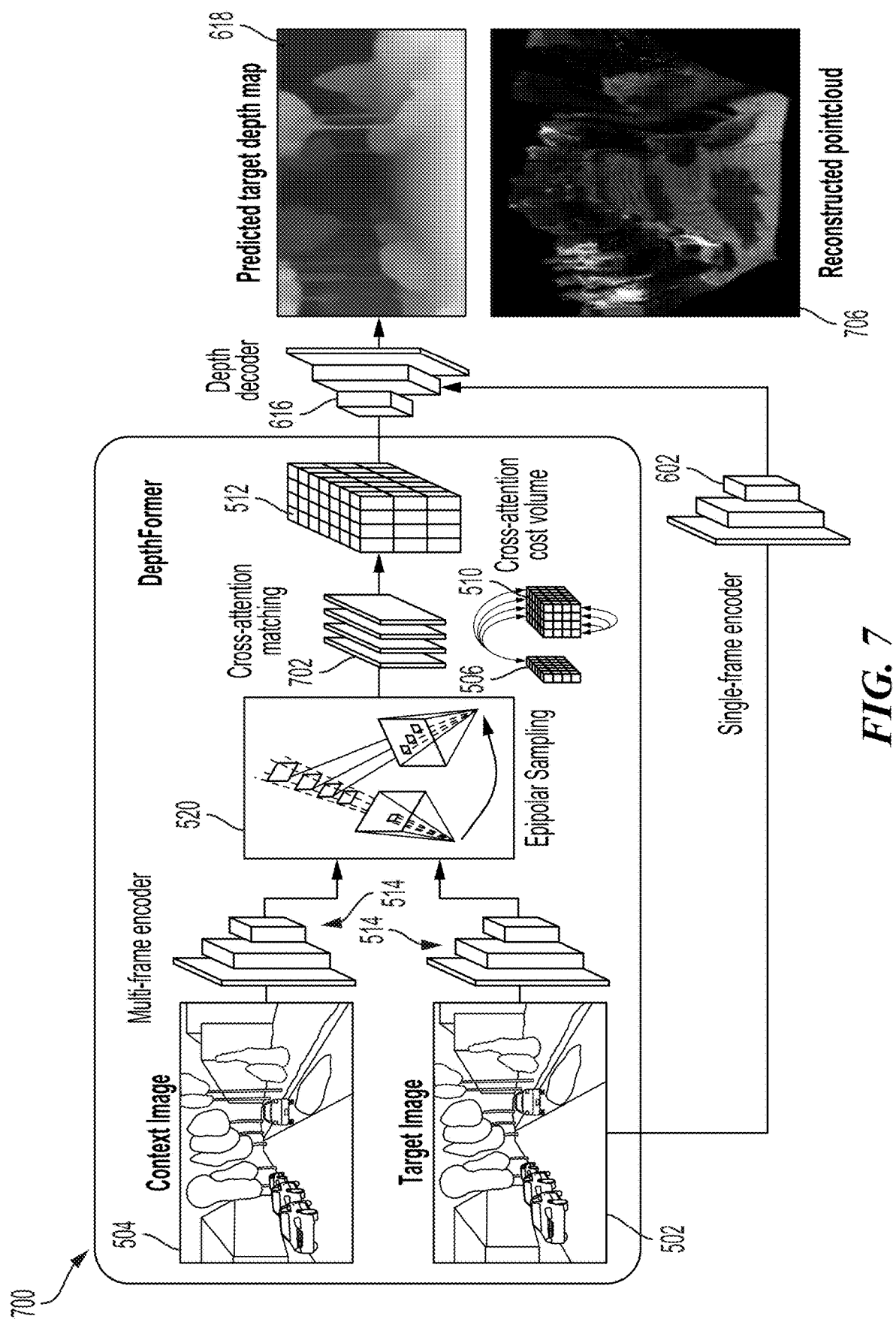
FIG. 7 is a block diagram illustrating an example of a depth-prediction architecture, in accordance with various aspects of the present disclosure.

FIG. 7 is a block diagram illustrating an example of a depth-prediction architecture 700, in accordance with various aspects of the present disclosure. As shown in FIG. 7, the depth-prediction architecture 700 receives a context image 504 and a target image 502. Target features ($F_t$) (not shown in FIG. 7) may be generated by processing the target image 502 by a multi-frame encoder 514. Additionally, context features ($F_c$) (not shown in FIG. 7) may be generated by processing the context image 504 by a multi-frame encoder 514. The target features and context features may be processed via epipolar sampler 520. Cross-attention matching 702 may be performed based on the output of the epipolar sampler 520 to generate a cross-attention cost volume 512. The cross-attention matching 702 is performed as described with reference to FIG. 5A in relation to the target features 506) and the feature volume 510 ($C_{t \to c}$).

Additionally, as shown in FIG. 7, the target image 502 may be processed by a single-frame encoder 602 (e.g., a single-frame depth network). The single-frame features generated by the single-frame encoder 602 may be augmented with the cross-attention cost volume 512 as described with reference to FIG. 6. The augmented features may be processed by a decoding network 616 to predict a target depth map 618. The target depth map 618 shown in FIG. 7 may be a target depth map 618, described with reference to FIG. 6, associated with a highest scale. The target depth map 618 may be used to generate a pointcloud reconstruction 706.

In the example of FIG. 7, implementation, a teacher network is used to supervise the cost volume. In some such implementations, the teacher network may be a single-frame encoder (not shown in FIGS. 6 and 7). As discussed, an accuracy of depth estimate of a multi-frame depth estimate network (e.g., cost volume-based depth estimate network) may be reduced due to the presence of dynamic objects, changes in viewpoints, errors in pose estimation, object occlusion, and/or textureless areas. In contrast, an accuracy of a depth estimate of the single-frame encoder 602 (e.g., single-frame depth estimation network) may not be affected by the presence of dynamic objects, changes in viewpoints, errors in pose estimation, object occlusion, and/or textureless areas. Therefore, the depth estimate generated by a single-frame depth estimate network may be used as guidance for generating correct pixel matches in the cost volume-based depth estimate network.

During training, a depth estimation network may determine a loss based on a difference between a ground-truth depth estimate and a depth estimate generated by the depth estimation network. In some examples, the depth estimation network may be trained to minimize the loss between the ground-truth depth estimate and the depth estimate generated by the depth estimation network. In some such examples, the ground-truth depth estimate may be provided by a sensor, such as a LIDAR sensor, or another source, such as previously determined depth estimates. In other such examples, a teacher network may be used to provide the ground-truth depth estimates.

As discussed, in some aspects, the ground-truth depth estimate may be provided by a sensor, such as a LIDAR sensor, or another source, such as previously determined depth estimates. As an example, a LIDAR sensor associated with an agent, such as a vehicle 100 as described with reference to FIGS. 1A and 1B, may generate depth estimates for a scene. The depth estimates generated by the LIDAR sensor may be used as ground-truth depth estimates for a depth estimation network, such as a depth estimation network that estimates depth based on a cost volume. The depth estimates may also be referred to as a depth map.

In some implementations, the ground-truth depth estimate may be initially discretized based on a depth range used to generate the cost volume. The discretized ground-truth depth estimate may be used to generate a binary cost volume. Incorrect cells of the binary cost volume may be empty and the correct cells may be full. Because the correct cells are full, a mask may be generated based on the correct cells and the incorrect cells. In such implementations, the binary cost volume may be used as a mask to adjust a value of a similarity metric of the cost volume predicted by the depth estimation network, such that an accuracy of correctly matched pixels increases. In some examples, the mask reduces the similarity metric of corresponding pixels, thereby increasing the similarity of the corresponding pixels. In such implementations, the mask generated based on the ground-truth depth estimate is used in self-supervised training to increase an accuracy of corresponding pixels, which increases an accuracy of the cost volume-based depth estimate.

The depth-prediction architecture 700 may be trained end-to-end using only a photometric reprojection loss, consisting of a weighted sum between a structural similarity (SSIM) and absolute error (L1) terms. The photometric loss ($L_p$) may be determined as follows:

$$L_p(I_t, \hat{I}_t) = \alpha \frac{1 - SSIM(I_t, \hat{I}_t)}{2} + (1-\alpha)\|I_t - \hat{I}_t\|, \quad (1)$$

where SSIM( ) is a function for estimating a structural similarity (SSIM) between the target image 502 and a reconstructed warped image, obtained by projecting information from another frame, in the sequence of frames, onto the target image 502. The SSIM may be determined as follows:

$$SSIM(x,y) = [l(x,y)]^\alpha \cdot [c(x,y)]^\beta \cdot [s(x,y)]^\gamma, \quad (2)$$

where s( ) determines a structure similarity, c( ) determines a contrast similarity, and l( ) determines a luminance similarity. $\alpha$, $\beta$, and $\gamma$ are parameters for adjusting a relative importance of each component, and each parameter is greater than zero.

Figure 8:
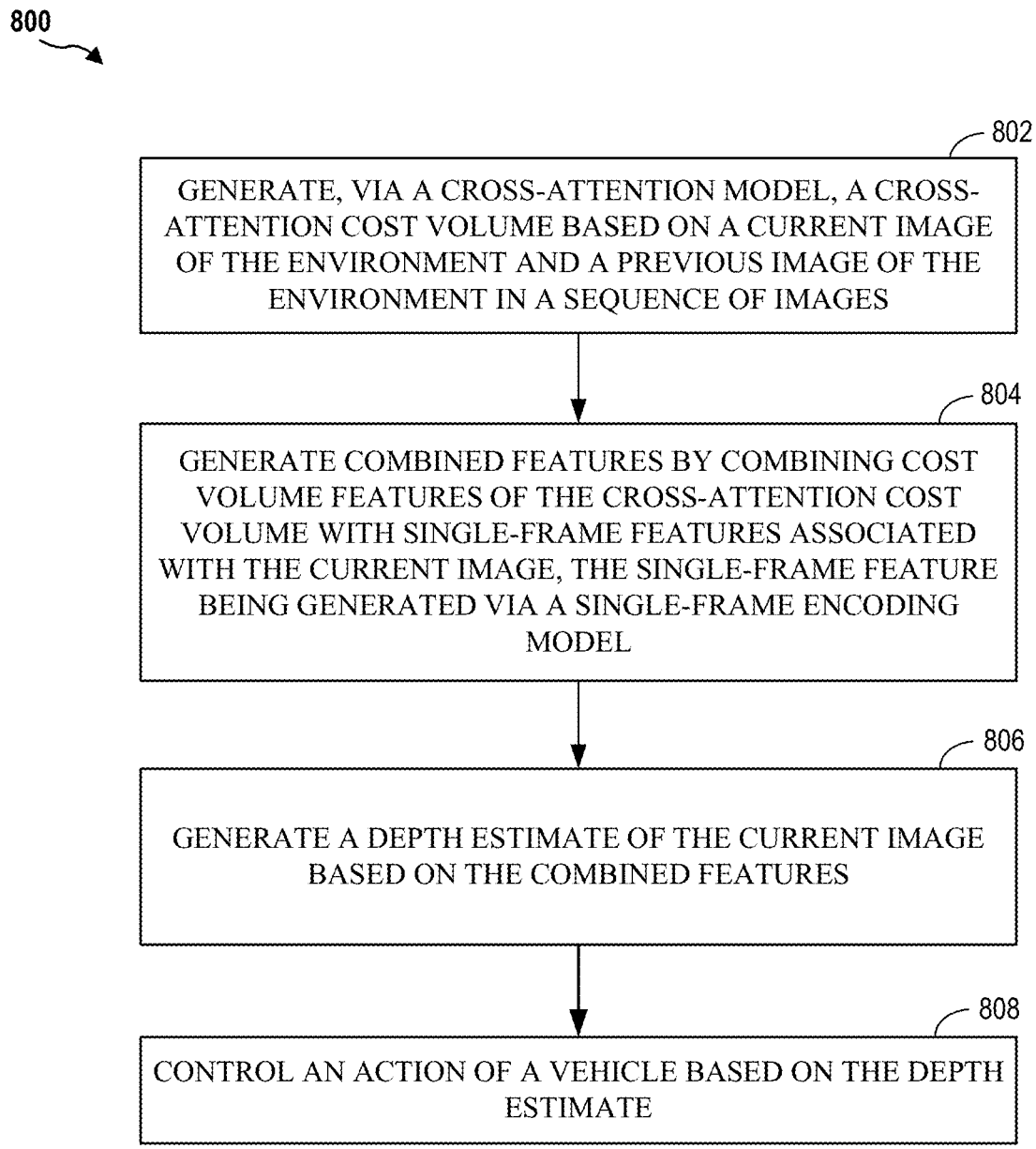
FIG. 8 illustrates a flow diagram for a method according to aspects of the present disclosure.

FIG. 8 is a diagram illustrating an example process 800 performed in accordance with various aspects of the present disclosure. The process 800 may be performed by a vehicle, such as a vehicle 100 as described with reference to FIGS. 1A and 1B, and/or a depth estimation module of a vehicle, such as the depth estimation system 390 as described with reference to FIG. 3. The vehicle may be referred to as an agent. The example process 800 is an example of depth estimation.

As shown in FIG. 8, the process 800 begins at block 802 by generating, via a cross-attention model, a cross-attention cost volume based on a current image of the environment and a previous image of the environment in a sequence of images. In some examples, the current image and the previous image are captured (e.g., obtained) by a monocular camera associated with the vehicle, wherein the current image and the previous image are two-dimensional (2D) images.

In some examples, the process 800 generates current image features from the current image via a feature extraction network. Each one of the current image features may correspond to a current image pixel in the current image. Additionally, the process 800 may generate previous image features from the previous image via the feature extraction network. Each one of the previous image features may correspond to a previous image pixel in the previous image.

The cross-attention cost volume may be generated by cross-attention matching each feature from the current image features with one or more features of the previous image features. The cross-attention matching may include sampling, for each current image pixel, one or more candidate pixels from the previous image corresponding to the current image pixel along an epipolar line. The cross-attention matching may also include matching, for each current image pixel, a current image feature associated with the current image pixel with each previous image feature associated with the one or more sampled candidate pixels corresponding to the current image pixel.

At block 804, the process 800 generates combined features by combining cost volume features of the cross-attention cost volume with single-frame features associated with the current image. The single-frame features may be generated via a single-frame encoding model. Furthermore, in some examples, the process 800 may remove each cost volume feature of the cost volume features that satisfies a removal condition. The cost volume features and the single-frame features may be combined after removing each cost volume that satisfies the removal condition At block 806, the process 800 generates a depth estimate of the current image based on the combined features. A three-dimensional (3D) reconstruction of the environment may be generated via the depth estimate. At block 808, the process 800 controls an action of the vehicle based on the depth estimate. In some examples, the cross-attention model and the single-frame encoding model may be trained end-to-end in a self-supervised manner Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a vehicle in an environment, comprising:
generating, via a cross-attention model, a cross-attention cost volume based on a current image of the environment and a previous image of the environment in a sequence of images;
generating combined features by combining cost volume features of the cross-attention cost volume with single-frame features associated with the current image, the single-frame features being generated via a single-frame encoding model;

generating a depth estimate of the current image based on the combined features; and controlling an action of the vehicle based on the depth estimate.

2. The method of claim 1, further comprising:

generating current image features from the current image via a feature extraction network, each one of the current image features corresponds to a current image pixel in the current image; and generating previous image features from the previous image via the feature extraction network, each one of the previous image features corresponds to a previous image pixel in the previous image, wherein the cross-attention cost volume is generated by cross-attention matching each feature from the current image features with one or more features of the previous image features.

3. The method of claim 2, further comprising cross-attention matching each feature from the current image features with the one or more features of the previous image features by:

sampling, for each current image pixel, one or more candidate pixels from the previous image corresponding to the current image pixel along an epipolar line; and matching, for each current image pixel, a current image feature associated with the current image pixel with each previous image feature associated with the one or more sampled candidate pixels corresponding to the current image pixel.

4. The method of claim 1, further comprising removing each cost volume feature of the cost volume features that satisfies a removal condition, wherein the cost volume features and the single-frame features are combined after removing each cost volume that satisfies the removal condition.

5. The method of claim 1, further comprising obtaining the current image and the previous image from a monocular camera associated with the vehicle, wherein the current image and the previous image are two-dimensional (2D) images.

6. The method of claim 1, further comprising generating a three-dimensional (3D) reconstruction of the environment via the depth estimate.

7. The method of claim 1, further comprising training the cross-attention model and the single-frame encoding model end-to-end in a self-supervised manner.

8. An apparatus for controlling a vehicle in an environment, comprising:

a processor; and a memory coupled with the processor and storing instructions operable, when executed by the processor, to cause the apparatus to:

generate, via a cross-attention model, a cross-attention cost volume based on a current image of the environment and a previous image of the environment in a sequence of images;

generate combined features by combining cost volume features of the cross-attention cost volume with single-frame features associated with the current image, the single-frame features being generated via a single-frame encoding model;

generate a depth estimate of the current image based on the combined features; and control an action of the vehicle based on the depth estimate.

9. The apparatus of claim 8, wherein execution of the instructions further cause the apparatus to:

generate current image features from the current image via a feature extraction network, each one of the current image features corresponds to a current image pixel in the current image;

generate previous image features from the previous image via the feature extraction network, each one of the previous image features corresponds to a previous image pixel in the previous image, wherein the cross-attention cost volume is generated by cross-attention matching each feature from the current image features with one or more features of the previous image features.

10. The apparatus of claim 9, wherein execution of the instructions further cause the apparatus to cross-attention match each feature from the current image features with the one or more features of the previous image features by:

sampling, for each current image pixel, one or more candidate pixels from the previous image corresponding to the current image pixel along an epipolar line; and matching, for each current image pixel, a current image feature associated with the current image pixel with each previous image feature associated with the one or more sampled candidate pixels corresponding to the current image pixel.

11. The apparatus of claim 8, wherein execution of the instructions further cause the apparatus to remove each cost volume feature of the cost volume features that satisfies a removal condition, wherein the cost volume features and the single-frame features are combined after removing each cost volume that satisfies the removal condition.

12. The apparatus of claim 8, wherein execution of the instructions further cause the apparatus to obtain the current image and the previous image from a monocular camera associated with the vehicle, wherein the current image and the previous image are two-dimensional (2D) images.

13. The apparatus of claim 8, wherein execution of the instructions further cause the apparatus to generate a three-dimensional (3D) reconstruction of the environment via the depth estimate.

14. The apparatus of claim 8, wherein execution of the instructions further cause the apparatus to train the cross-attention model and the single-frame encoding model end-to-end in a self-supervised manner.

15. A non-transitory computer-readable medium having program code recorded thereon for controlling a vehicle in an environment, the program code executed by a processor and comprising:

program code to generate, via a cross-attention model, a cross-attention cost volume based on a current image of the environment and a previous image of the environment in a sequence of images;

program code to generate combined features by combining cost volume features of the cross-attention cost volume with single-frame features associated with the current image, the single-frame features being generated via a single-frame encoding model;

program code to generate a depth estimate of the current image based on the combined features; and program code to control an action of the vehicle based on the depth estimate.

16. The non-transitory computer-readable medium of claim 15, wherein the program code further comprises:

program code to generate current image features from the current image via a feature extraction network, each one of the current image features corresponds to a current image pixel in the current image;

program code to generate previous image features from the previous image via the feature extraction network, each one of the previous image features corresponds to a previous image pixel in the previous image, wherein the cross-attention cost volume is generated by cross-attention matching each feature from the current image features with one or more features of the previous image features.

17. The non-transitory computer-readable medium of claim 16, wherein the program code further comprises program code to cross-attention match each feature from the current image features with the one or more features of the previous image features by:

sampling, for each current image pixel, one or more candidate pixels from the previous image corresponding to the current image pixel along an epipolar line; and matching, for each current image pixel, a current image feature associated with the current image pixel with each previous image feature associated with the one or more sampled candidate pixels corresponding to the current image pixel.

18. The non-transitory computer-readable medium of claim 15, wherein the program code further comprises program code to remove each cost volume feature of the cost volume features that satisfies a removal condition, wherein the cost volume features and the single-frame features are combined after removing each cost volume that satisfies the removal condition.

19. The non-transitory computer-readable medium of claim 15, wherein the program code further comprises program code to obtain the current image and the previous image from a monocular camera associated with the vehicle, wherein the current image and the previous image are two-dimensional (2D) images.

20. The non-transitory computer-readable medium of claim 15, wherein the program code further comprises program code to generate a three-dimensional (3D) reconstruction of the environment via the depth estimate.

* * * * *